Figures 1, 2:
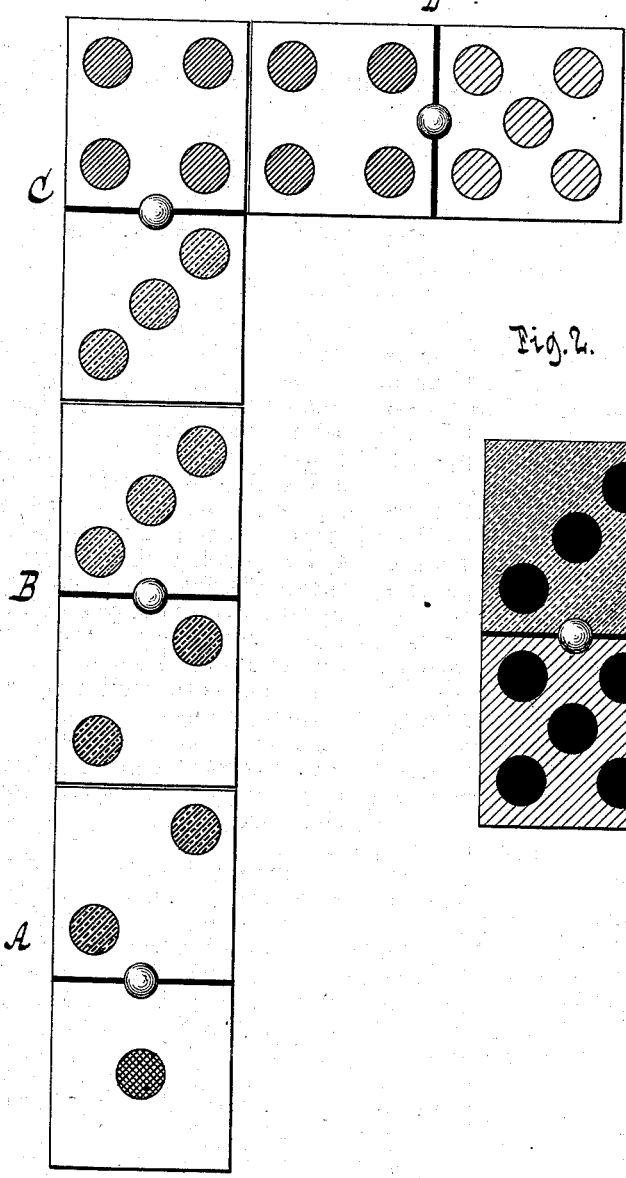

(No Model.)

R. H. WILLIAMS.
DOMINO.

No. 278,646.

Patented May 29, 1883.

WITNESSES:
Otto Hefeland
William Miller

INVENTOR
Richard H. Williams
BY Van Santvoord & Hauff
ATTORNEYS

UNITED STATES PATENT OFFICE.

RICHARD H. WILLIAMS, OF MOUNT VERNON, NEW YORK.

DOMINOS.

SPECIFICATION forming part of Letters Patent No. 278,646, dated May 29, 1883.

Application filed March 26, 1883. (No model.)

*To all whom it may concern:*

Be it known that I, RICHARD H. WILLIAMS, a citizen of the United States, residing at Mount Vernon, in the county of Westchester and State of New York, have invented new and useful Improvements in Dominos, of which the following is a specification.

This invention consists in a set of dominos in which each number is distinguished by a separate color—for instance, the two spots or the spaces bearing the two spots being orange, the three spots or the spaces bearing them being brown, and so on, so that any mistake in matching the pieces will be instantly detected.

In the accompanying drawings, Figure 1 represents a portion of a set of dominos in which the spots are distinguished by different shading or coloring. Fig. 2 shows two pieces in which the spots are colored alike, but the spaces bearing said spots are distinguished by different shading or coloring.

Similar letters indicate corresponding parts.

In the drawings, the letters A B C D designate different pieces of dominos, which illustrate my invention. The faces of all these pieces are colored alike, either white or of any other desirable color; but the spots are distinguished by different colors, the different shading being used in the drawings to indicate different colors. Thus the color of all the one spots in the set may be blue, the color of all the two spots yellow, the color of all the three spots brown, the color of all the four spots red, the color of all the five spots green, and the color of all the six spots black. By these means mistakes in matching the pieces are avoided.

Instead of distinguishing the various numbers by different colors of the spots, they may be distinguished by different colors of the spaces bearing the various numbers, as shown in Fig. 2. For instance, all the spaces bearing one spots may be colored blue; all the spaces bearing two spots, yellow; all the spaces bearing three spots, brown; all the spaces bearing four spots, red; all the spaces bearing five spots, green; all the spaces bearing six spots, gray, while all the spots in the set are colored black.

Of course the colors may be changed according to taste or fancy; but it is essential that all the one spots, or all the spaces carrying one spots, shall be colored alike; all the two spots, or all the spaces carrying two spots, shall also be colored alike, but different from the one spots, or from the spaces carrying the one spots, and so on, as will be readily understood from the example above given.

What I claim as new, and desire to secure by Letters Patent, is—

A set of dominos in which each number is distinguished by a separate color, substantially as and for the purpose shown and described.

In testimony whereof I have hereunto set my hand and seal in the presence of two subscribing witnesses.

RICHARD H. WILLIAMS. [L. S.]

Witnesses:
W. HAUFF,
E. F. KASTENHUBER.